(12) United States Patent
Miao et al.

(10) Patent No.: US 9,179,390 B2
(45) Date of Patent: Nov. 3, 2015

(54) COMMUNICATION UNIT AND A METHOD IN A WIRELESS COMMUNICATION NETWORK

(75) Inventors: Qingyu Miao, Beijiing (CN); Jiansong Gan, Beijing (CN); Rong Hu, Sollentuna (SE); Afif Osseiran, Kista (SE); Zhang Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 628 days.

(21) Appl. No.: 12/919,639

(22) PCT Filed: Jan. 21, 2009

(86) PCT No.: PCT/SE2009/050061
§ 371 (c)(1),
(2), (4) Date: Aug. 26, 2010

(87) PCT Pub. No.: WO2009/110835
PCT Pub. Date: Sep. 11, 2009

(65) Prior Publication Data
US 2010/0329190 A1  Dec. 30, 2010

(30) Foreign Application Priority Data
Mar. 3, 2008  (EP) ..................................... 08152212

(51) Int. Cl.
H04L 12/28  (2006.01)
H04W 40/02  (2009.01)
H04L 12/707  (2013.01)

(52) U.S. Cl.
CPC .............. *H04W 40/02* (2013.01); *H04L 45/22* (2013.01)

(58) Field of Classification Search
CPC ... H04W 40/00; H04W 40/02; H04W 40/125; H04L 45/00; H04L 45/02; H04L 45/22
USPC ................ 370/238, 260, 280, 315, 328, 338; 455/7, 9, 11.1, 13.1, 315
See application file for complete search history.

(56) References Cited

U.S. PATENT DOCUMENTS

| 7,933,549 B2 | 4/2011 | Larsson |
| 2007/0091801 A1* | 4/2007 | Shahidi et al. ................ 370/230 |
| 2008/0207117 A1* | 8/2008 | Lim et al. ......................... 455/9 |

FOREIGN PATENT DOCUMENTS

| EP | 1610503 A1 | 12/2005 |
| JP | 2007500482 A | 1/2007 |
| WO | 00/39967 | 7/2000 |

OTHER PUBLICATIONS

Musavian et al., Closed-Form Capacity Expression of Orthogonalized Correlated MIMO Channels, IEEE 2004.*

(Continued)

*Primary Examiner* — Mang Yeung
(74) *Attorney, Agent, or Firm* — Coats & Bennett, P.L.L.C.

(57) ABSTRACT

A communication unit for use in a wireless communication system in which a transmitting unit is arranged for wireless communication with at least one receiving unit, said network further comprising at least a first and a second relay node arranged to receive a signal from the transmitting unit and forward it to the receiving unit, said node being characterized in that it comprises a processor arranged to perform the following steps: identifying at least a first and a second communication path between the transmitting unit and the receiving unit, at least one of said paths involving the first or the second relay node, calculating a first and a second capacity of at least one hop in the first and second communication path, respectively communicating information related to the first and second capacity to at least one other communication node in the wireless network.

18 Claims, 2 Drawing Sheets

(56) References Cited

OTHER PUBLICATIONS

Musavian, L. et al. "Closed Form Capasity Expressions of Orthogonalized Correlated MIMO Channels." IEEE Communications Letters, vol. 8, No. 6, Jun. 2004, pp. 365-367.

Koike, T. et al., "Capacity Improvement of Multihop Inter-Vehicle Communication Networks by STBC Cooperative Relaying," IEICE Transactions on Communications, Sep. 2005, pp. 3546-3553, vol. E88-B, No. 9.

Alamouti, S. "A Simple Transmit Diversity Technique for Wireless Communications." IEEE Journal on Select Areas in Communications, vol. 16, No. 8, Oct. 1998, pp. 1451-1458.

Tu, Y-S. et al. "Coherent Cooperative Transmission From Multiple Adjacent Antennas to a Distant Stationary Antenna Through AWGN Channels." IEEE 55th Vehicular Technology Conference, 2002, VTC Spring 2002, vol. 1, pp. 130-134.

Anghel, P. et al. "Distributed Space-Time Coding in Cooperative Networks." In Proc. of the Nordic Signal Processing Symposium, Norway, Oct. 4 -7, 2002.

Anghel, P. et al. "Multi-User Space-Time Coding in Cooperative Networks." 2003 IEEE International Conference on Acoustics, Speech, and Signal Processing, 2003, ICASSP '03, vol. 4, Apr. 6-10, 2003, pp. IV-73-76.

Fan, Y. et al. "On the Outage Capacity of MIMO Multihop Networks." IEEE Global Telecommunications Conference, 2005, Globecom '05, vol. 4, Dec. 2005, pp. 2204-2208.

Sreng, V. et al. "Relayer Selection Strategies in Cellular Networks with Peer-to-Peer Relaying." 2003 IEEE 58th Vehicular Technology Conference, 2003, VTC 2003-Fall, vol. 3, Oct. 6-9, 2003, pp. 1949-1953.

Dohler, M. et al. "Space-Time Block Codes for Virtual Antenna Arrays." The 13th IEEE International Symposium on Personal, Indoor and Mobile Radio Communications, 2002, vol. 1, Sep. 15-18, 2002, pp. 414-417.

Zeng, Z. et al. "System Performance of a W-CDMA based Network with deployed Virtual Antenna Arrays." in Proc. of IEEE ICT2002, Beijing, Jun. 23-26, 2002.

\* cited by examiner

COMMUNICATION UNIT AND A METHOD IN A WIRELESS COMMUNICATION NETWORK

TECHNICAL FIELD

The present invention relates to a node and a method for use in a wireless communication network, in particular for optimizing route selection in such a network.

BACKGROUND AND RELATED ART

In the development of wireless/cellular communication networks and systems a good coverage and support of higher data rate, are desired. At the same time, the cost aspect of building and maintaining the system is of great importance and is expected to become even more so in the future. The topology of existing wireless communication systems has traditionally been characterized by the cellular architecture with the fixed radio base stations and the mobile stations as the only transmitting and receiving entities in the networks typically involved in a communication session.

One way to introduce diversity in the received signal is to exploit the spatial diversity offered when multiple antennas are used at the transmitter with the possibility of using one or more antennas at the receiver. The use of multiple antennas offers significant diversity and multiplexing gains relative to single antenna systems. Multiple-Input Multiple-Output (MIMO) wireless systems can thus improve the link reliability and the spectral efficiency relative to Single-Input Single-Output (SISO) system. In wireless systems it is generally not desired to include more than one antenna in the mobile terminals, since they should be kept as small and light as possible.

Another method that offers macro-diversity is relaying. A relaying system is a conventional radio network that is complemented with relay nodes. The relay nodes communicate wirelessly with other network elements, such as a base station, another relay and/or a user terminal. In this way, relay nodes can be used to introduce diversity in a system where one or both of the communicating units only has one antenna. A cooperative relaying system is a relaying system where the information sent to an intended destination is conveyed through various routes and combined at the destination. Each route can consist of one or more hops utilizing the relay nodes. In addition, the destination may receive the direct signal from the source. Cooperative relaying system can be divided into numerous categories based on desired parameters.

P. A. Anghel, G. Leus, M. Kaveh, "Multi-User Space-Time Coding in Cooperative Networks," in Proc. of IEEE ICASSP, Hong-Kong, Apr. 6-10, 2003, and P. A. Anghel, G. Leus, and M. Kaveh, "Distributed Space-Time Coding in Cooperative Networks," In Proc. of the Nordic Signal Processing Symposium, Norway, Oct. 4-7, 2002 discuss relaying schemes based on transmit diversity.

The coherent transmission for cooperating transmitters has been investigated for a regenerative case and with identical transmit powers in Yung-Szu Tu and Gregory Pottie, "Coherent Cooperative Transmission from Multiple Adjacent Antennas To a Distant Stationary Antenna Through AWGN Channels", in Proc. of IEEE VTC 2002, Birmingham, Ala., USA, May 6-9, 2002.

In the literature numerous relaying schemes have been compared to a single hop system in order to a give general recommendation for the suitable scenarios for the deployment of a multi-hop system.

Y. Fan and J. S. Thompson, "On the Outage Capacity of MIMO Multihop Networks", IEEE Globecom 2005, St. Louis, USA, November 2005 discloses a routing algorithm where the decision is based on instantaneous channel state information (CSI). This method has limitations since in practice obtaining the instantaneous CSI is not realistic in an FDD system type.

V. Sreng, H. Yanikomeroglu, and D. D. Falconer, "Relayer Selection Strategies in Cellular Networks With Peer-to-Peer Relaying," IEEE VTC Fall October 2003 discloses a routing algorithm based on the path-gain. A routing algorithm based on the path-gain is not optimal since the fast fading of radio channel is not taken into account in a proper way.

SUMMARY OF THE INVENTION

It is an object of the invention to improve route selection in wireless networks involving relay nodes.

In one aspect, the invention relates to a communication unit, typically a user terminal, for use in a wireless communication system in which a transmitting unit is arranged for wireless communication with at least one receiving unit, said network further comprising at least a first and a second relay node arranged to receive a signal from the transmitting unit and forward it to the receiving unit, said node being characterized in that it comprises a processor arranged to perform the following steps:

identifying at least a first and a second communication path between the transmitting unit and the receiving unit, at least one of said paths involving the first or the second relay node, calculating a first and a second capacity of at least one hop in the first and second communication path, respectively communicating information related to the first and second capacity to at least one other communication node in the wireless network.

The invention also relates to a communication unit for use in a wireless communication system in which a transmitting unit is arranged for wireless communication with at least one receiving unit, said network further comprising at least a first and a second relay node arranged to receive a signal from the transmitting unit and forward it to the receiving unit, said node being characterized in that it comprises a processor arranged to perform the following steps:

receiving information from another communication unit in the wireless communication system related to a first and a second capacity of at least one hop in a first and a second communication path between the transmitting unit and the receiving unit, respectively, and selecting the relaying scheme based on the first and second calculated capacity.

This communication unit is typically the base station or one or more of the relay nodes.

The invention also relates to a method in a wireless communications network comprising at least one transmitting unit arranged for wireless communication with at least one receiving unit, said network further comprising at least a first and a second relay node arranged to receive a signal from the transmitting unit and forward it to the receiving unit, of selecting a relay scheme for communication between the transmitting unit and the receiving unit, said method comprising the following steps:

identifying at least a first and a second communication path between the transmitting unit and the receiving unit, at least one of said paths involving the first or the second relay node, calculating a first and a second capacity of at least one hop in the first and second communication path, respectively selecting the relaying scheme based on the first and second calculated capacity.

The capacity should be a long-term capacity of the path, or hop. In a preferred embodiment the capacity is calculated based on second order statistics for the connection.

For example, the capacity may be calculated based on the equation $$C_{erg} \approx R\log_2(e)\left(\ln\left(1 + \frac{S}{n_t RN}\mu_\lambda\right) - \frac{\sigma_\lambda^2}{2\left(\frac{n_t RN}{S} + \mu_\lambda\right)^2}\right),$$

wherein
R is the code rate of STBC,
S/N is the transmitted SINR,
$\eta_t$ is the number of transmitting antenna
$\eta_r$ is the number of receiving antenna
$\mu$ is the mean value and $\sigma^2$ is the variance of the channel in the second hop A simplified version of this equation in which the variance $\sigma^2$ is ignored can also be used.

The basic idea is to switch between cooperative relaying selection diversity and relaying STBC in order to optimize the throughput of a multi-hop system. The switching threshold is based on the long term ergodic capacity (i.e second order statistics of the channel) and not on the instantaneous channel state information. The calculation of the mean capacity can be derived from the Taylor's series method, which allows accurate and easy way for estimating the capacity.

For instance relay selection diversity is more suitable than relay Alamouti under certain channel conditions hence none of the two schemes will yield an optimal system capacity under all channel conditions.

By optimizing route selection, the node and method according to the invention increase the system capacity of a multi-hop system.

The proposed method relies on long-term capacity data, such as the second order statistics of the channel and not on the instantaneous channel state information since the selection of relaying scheme is based on the long term ergodic capacity (i.e. second order statistics of the channel). As a consequence the proposed method is more robust against channel impairments.

The inventive method could also be implemented in a configuration in which mobile terminals are used as relay nodes, as long as the mobile terminals do not move at too high speed. Such a configuration is discussed, for example, in. A. Anghel, G. Leus, M. Kaveh, "Multi-User Space-Time Coding in Cooperative Networks," in Proc. of IEEE ICASSP, Hong-Kong, Apr. 6-10, 2003 and in M. Dohler, E. Lefranc, H. Aghvami, "Space-Time Block Codes for Virtual Antenna Arrays," in Proc. of IEEE PIMRC2002, Lisbon, Portugal, Sep. 15-18, 2002.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
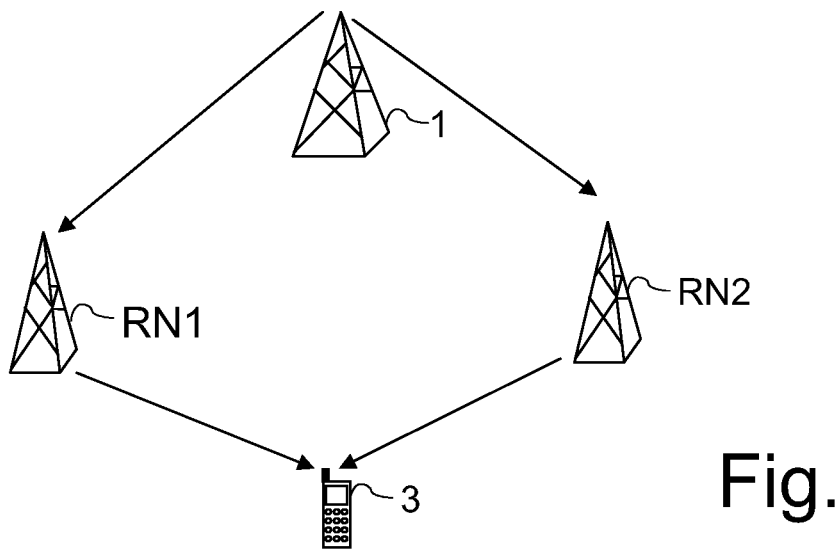
FIG. 1 is a system model showing a base station, a user terminal and two relay nodes.

A system model including one base station 1, one user terminal 3 and two relay nodes RN1, RN2 is shown in FIG. 1. The user terminals in the system can be served by both relay nodes RN1, RN2 cooperatively or served by one of the relay nodes. It is assumed, for the sake of this example, that the first hop is perfect, and the purpose is to choose the relay node based on the second hop to maximize the ergodic capacity. The user terminal that needs relaying can be served by [RN1], [RN2], or [RN1, RN2]. It is also assumed that the total available transmit power is constant or limited.

The relay selection criterion can be determined by calculating a capacity for each possible relaying scheme and comparing the calculated capacities, as will be discussed below. Typically, the case with the highest capacity can be selected, although it may be possible to take other considerations into account. When the user terminal is near the first relay node RN1, the scheme where the entire transmit power is used by the first relay node would give the highest capacity, and therefore this relaying scheme could be chosen. When the user terminal is near the second relay node RN2, the scheme where the entire transmit power is used by the second relay node would give the highest capacity, and therefore this relaying scheme could be chosen. When the user terminal is located approximately half-way between the relaying nodes RN1, RN2, the highest capacity will typically be achieved by letting the relaying nodes RN1 and RN2 share the available power.

In the calculations below the following definitions will be used:
R is the code rate of STBC,
S/N is the transmitted SINR,
$\eta_t$ is the number of transmitting antenna
$\eta_r$ is the number of receiving antenna
H is the channel matrix between the transmitter and receiver
E {.} is the expected value of its argument According to Leila Musavian, Mischa Dohler, et al, "Closed-Form Capacity Expression of othogonalized correlated MIMO channels", IEEE communication letters, VOL. 8, No. 6, June, 2004, the capacity of distributed STBC is $$C = R\log_2\left(1 + \frac{1}{R}\frac{\|H\|^2}{n_t}\frac{S}{N}\right) \quad (1)$$

The channel matrix H between the transmitter and receiver is given by:

$$\|H\|^2 = \sum_{i=1}^{t}\sum_{j=1}^{r}|h_{ij}|^2 = tr(HH^H) \quad (2)$$

Where $h_{ij}$ is the element of the channel matrix H.
The ergodic capacity $C_{erg}$ is $$C_{erg} = E_\lambda\left\{R\log_2\left(1 + \frac{1}{R}\frac{\lambda}{n_t}\frac{S}{N}\right)\right\} \quad (3)$$

$$= \int_0^\infty R\log_2\left(1 + \frac{1}{R}\frac{\lambda}{n_t}\frac{S}{N}\right)f_\lambda(\lambda)d\lambda$$

where $f_\lambda(\lambda)$ is the probability density function of $\lambda$, and $\lambda$ is given by:

$$\lambda = \|H\|^2 = \sum_{i=1}^{n_r}\sum_{j=1}^{n_t} h_{ij}h_{ij}^*, \quad (4)$$

According to Eq. (1), the capacity C can be written as $$C(x) = R\log_2(1+x) = R\log_2(e)\ln(1+x) \quad (5)$$

Where $$x = \frac{1}{R}\frac{\|H\|^2}{n_t}\frac{S}{N} \quad (6)$$

$$\mu_x = E\{x\} = \frac{S}{n_t RN}E\{\|H\|^2\} = \frac{S}{n_t RN}\mu_\lambda \quad (7)$$

$$E\{x^2\} = \left(\frac{S}{n_t RN}\right)^2 E\{\|H\|^2\|H\|^2\} = \left(\frac{S}{n_t RN}\right)^2 E\{\lambda^2\} \quad (8)$$

$$\sigma_x^2 = E\{x^2\} - E^2\{x\} \quad (9)$$
$$= \left(\frac{S}{n_t RN}\right)^2 E\{\lambda^2\} - \left(\frac{S}{n_t RN}E\{\lambda\}\right)^2$$
$$= \left(\frac{S}{n_t RN}\right)^2 \sigma_\lambda^2$$

Expanding Eq. (5) by using the Taylor series of the capacity expression in the neighboring of a variable $x_0$ yields, $$C(x) = R\log_2(e)\ln(1+x) \quad (10)$$
$$= R\log_2(e)\left(\ln(1+x_0) + \frac{x-x_0}{1+x_0} - \frac{(x-x_0)^2}{2(1+x_0)^2} + \ldots\right)$$

Let $x_0 = \mu_x$ (11)

$$C_{erg} = E\{C\}$$
$$\approx R\log_2(e)\left(\ln(1+\mu_x) + \frac{E\{x\}-\mu_x}{1+\mu_x} - \frac{E\{(x-\mu_x)^2\}}{2(1+\mu_x)^2}\right)$$
$$= R\log_2(e)\left(\ln(1+\mu_x) - \frac{\sigma_x^2}{2(1+\mu_x)^2}\right)$$

Submitting Eqs. (7) and (9) into Eq. (11) yields, $$C_{erg} \approx R\log_2(e)\left(\ln(1+\mu_x) - \frac{\sigma_x^2}{2(1+\mu_x)^2}\right) \quad (12)$$
$$= R\log_2(e)\left(\ln\left(1+\frac{S}{n_t RN}\mu_\lambda\right) - \frac{\left(\frac{S}{n_t RN}\right)^2 \sigma_\lambda^2}{2\left(1+\frac{S}{n_t RN}\mu_\lambda\right)^2}\right)$$
$$= R\log_2(e)\left(\ln\left(1+\frac{S}{n_t RN}\mu_\lambda\right) - \frac{\sigma_\lambda^2}{2\left(\frac{n_t RN}{S}+\mu_\lambda\right)^2}\right)$$

From Eq. (12), it is easy to understand that the ergodic capacity can be predicted given the mean value $\mu$ and the variance $\sigma^2$ of the channel in the second hop.

Figure 2:
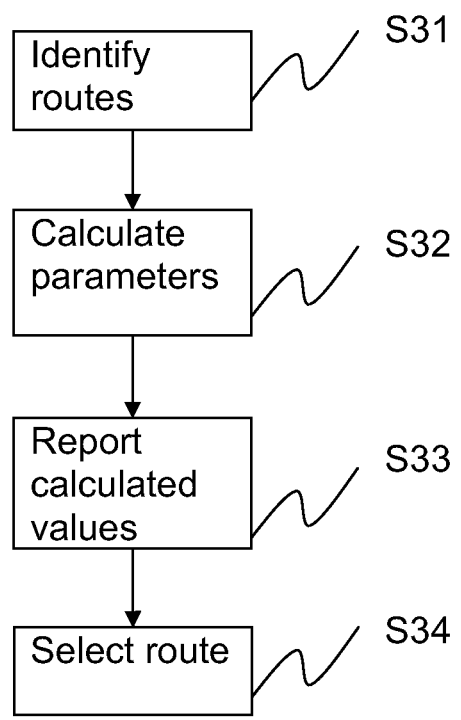
FIG. 2 is a flow chart of a method according to the invention.

FIG. 2 is a flow chart of a method according to an embodiment of the invention, used to select the optimal relaying scheme in a given situation. Referring to the system shown in FIG. 1 as an example only, the method comprises the steps of S31: identifying, in the user terminal, the different possible routes from the base station to the user terminal. Using the system of FIG. 1 as an example, four different routes could be identified, that is, through the first relay node RN1, through the second relay node RN2, or through both relay nodes RN1 and RN2, or directly without involving any relay node.

S32: for each of the different possible routes, calculating in the user terminal a parameter representing a long-term capacity. This may be achieved using second order statistics, for example, by calculating the ergodic capacity according to Eq. (12). Alternative equations may be used. For example, a simplified version of Eq. 12, shown as Eq. 13 may be used. In Eq. 13 the variance $\sigma^2$ is ignored since it might not be accurate when the SINR is high.

$$C_{erg} \approx R\log_2(e)\left(\ln\left(1+\frac{S}{n_t RN}\mu_\lambda\right)\right) \quad (13)$$

S33: the user terminal reports the calculated values to the relay nodes RN1, RN2 and/or to the base station.

S34: selecting in the base station or in the relay nodes, the route having the highest capacity as determined in step S32. If the selection is done in the base station, the base station communicates the decision to all the relay nodes concerned. The decision may alternatively be made by a relay node, in which case the deciding relay node must communicate the decision to all other relay nodes concerned. Yet another alternative would be to let each relay node make its own decision based on the same data received from the user terminal.

As will be obvious to the skilled person, the scheme can easily be expanded to configurations comprising more than two relay nodes. To ensure that the optimal route is selected, in such a configuration all possible routes should be identified. It may, however, be more practical to identify only some of the routes, for example, the ones most likely to give a high capacity in a given situation.

Figure 3:
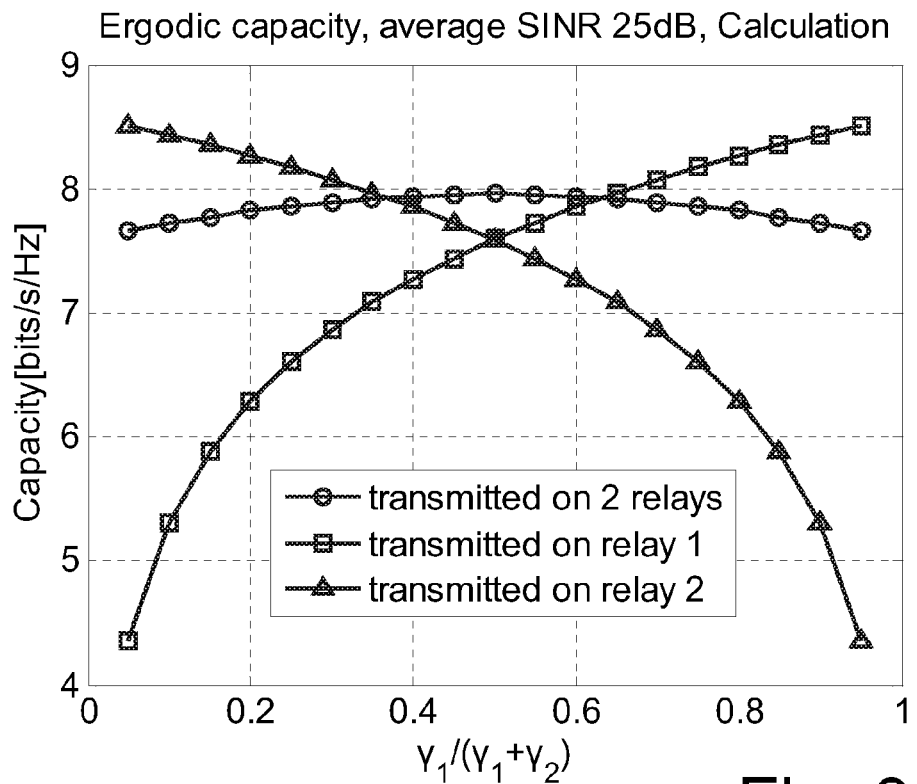
FIGS. 3 and 4 illustrate the ergodic capacity in the system of FIG. 1 based on simulation and on the proposed method, respectively.

FIG. 3 illustrates simulation results based on Eq. (1) above. In the simulation, the Rayleigh channel was assumed. The user terminal was deployed in different positions, and for each position 10 000 snapshots were generated, each corresponding to a channel realization. The capacity was calculated according to Eq. (1). The ergodic capacity for a channel realization is the mean value of the capacity in all of the snapshots related to this realization. The x axis represents $\gamma_1/(\gamma_1+\gamma_2)$, where $\gamma_1$ is $\gamma_1 = E\{h_{11}h_{11}^*\}$ and $\gamma_2 = E\{h_{12}h_{12}^*\}$ according to Eq. (4). Hence, the x axis indirectly represents the user terminal's position. When $\gamma_1/(\gamma_1+\gamma_2)$ is low, the user terminal is close to the second relay node RN2 and when $\gamma_1/(\gamma_1+\gamma_2)$ is high, the user terminal is close to the first relay node RN1. The curve marked with circles represents the situation when the signal is transmitted by both relay nodes RN1, RN2 in cooperation. The curve marked with squares represents the situation when the signal is transmitted only through the first relay node RN1. The curve marked with triangles represents the situation when the signal is transmitted only through the second relay node RN2.

Figure 4:
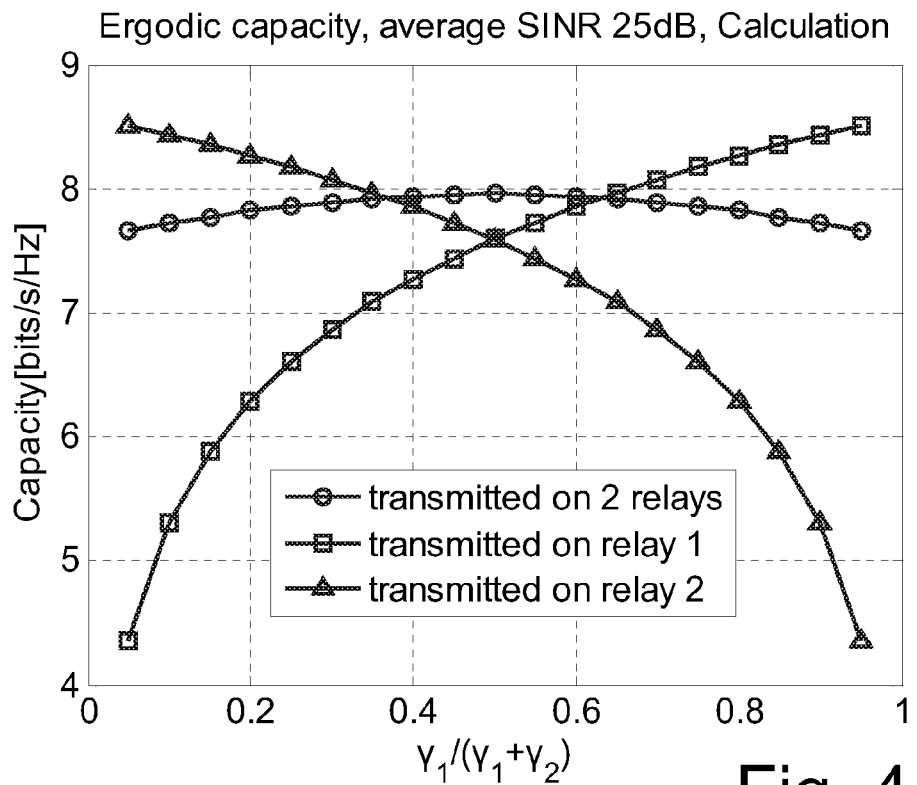

FIG. 4 illustrates the corresponding curves obtained using Eq. (12), where only the second order statistics of the channel, that is, $\mu_\lambda$ and $\sigma_\lambda^2$ are required. As can be seen, the curves in FIGS. 3 and 4 are essentially the same. Hence, the approximated method according to Eq. (12) yields substantially the same result as the simulation based on Eq. (1).

The invention claimed is:

1. A communication unit for use in a wireless communication network in which a transmitting unit is arranged for wireless communication with at least one receiving unit, said network further comprising at least a first relay node of a first multi-hop communication path being arranged to receive a signal from the transmitting unit and forward it to the receiving unit, and a second relay node of a second multi-hop communication path being arranged to receive a signal from the transmitting unit and forward it to the receiving unit, said communication unit comprising a hardware processor and a transceiver, said communication unit configured to:
   identify at least a first communication path and a second communication path, respectively between the transmitting unit and the receiving unit;
   calculate, by the hardware processor, at least a first capacity of the first communication path and a second capacity of the second communication path, respectively, said first capacity and second capacity representing long-term capacities of the first and second communication paths respectively, said long term capacities calculated based on a mean value and a variance of channel statistics and a number of transmitting antennas; and
   communicate, by the transceiver, information related to the capacities of the communications paths to at least one other communication unit in the network provided for comparing the first and second capacities and selecting a relaying scheme between relaying schemes based on the first and second capacities, at least one of the relaying schemes involving cooperative relaying between said first and second relay node.

2. A communication unit according to claim 1, wherein the processor is arranged to calculate at least one of the first and second capacities based on second order statistics for the corresponding communication path.

3. A communication unit according to claim 2, wherein the processor is arranged to calculate at least one of the first and second capacities based on the equation $$C_{erg} \approx R\log_2(e)\left(\ln\left(1 + \frac{S}{n_t RN}\mu_\lambda\right) - \frac{\sigma_\lambda^2}{2\left(\frac{n_t RN}{S} + \mu_\lambda\right)^2}\right)$$

wherein
R is the code rate of Space Time Block Coding (STBC),
S/N is the transmitted Signal to Interference and Noise Ratio (SINR),
$n_t$ is the number of transmitting antennas,
$\mu$ is the mean value and $\sigma^2$ is the variance of the channel in a second hop.

4. A communication unit according to claim 1, said communication unit is a user terminal acting as said receiving unit.

5. The communication unit of claim 1, wherein the selecting of a relaying scheme between relaying schemes based on the first and second capacities by the at least one other communication unit comprises switching between cooperative relaying selection diversity and relaying space time block coding (STBC) based on the first and second capacities.

6. A communication unit for use in a wireless communication network in which a transmitting unit is arranged for wireless communication with at least one receiving unit, said communication network further comprising at least a first relay node of a first multi-hop communication path arranged to receive a signal from the transmitting unit and forward it to the receiving unit and a second relay node of a second multi-hop communication path arranged to receive a signal from the transmitting unit and forward it to the receiving unit, said communication unit comprising a hardware processor and a transceiver, said communication unit configured to:
   receive, by the transceiver, information from another communication unit in the wireless communication network, said other communication unit identifying at least a first communication path and a second communication path, respectively between the transmitting unit and the receiving unit;
   calculate, by the hardware processor, at least a first capacity of the first communication path and a second capacity of the second communication path, respectively, said first capacity and second capacity representing long-term capacities of the first and second communication paths respectively, said long-term capacities calculated based on a mean value and a variance of channel statistics and a number of transmitting antennas; and
   compare the first and second capacities and select a relaying scheme between relaying schemes based on the first and second capacities, at least one of the relaying schemes involving cooperative relaying between said first and second relay node.

7. A communication unit according to claim 6, said communication unit being a base station acting as said transmitting unit and arranged to forward information relating to the selected relaying scheme to one or both of the first and second relay nodes.

8. A communication unit according to claim 6, said communication unit being one of the first and second relay nodes between a base station acting as said transmitting unit and a user terminal acting as said receiving unit.

9. A communication unit according to claim 8, further arranged to forward information relating to the selected relaying scheme to at least one other relay node in the wireless communication system.

10. The communication unit of claim 6, wherein the selecting of a relaying scheme between relaying schemes based on the first and second capacities comprises switching between cooperative relaying selection diversity and relaying space time block coding (STBC) based on the first and second capacities.

11. A method in a wireless communications network comprising at least one transmitting unit arranged for wireless communication with at least one receiving unit, said network further comprising at least a first relay node of a first communication multi-hop path being arranged to receive a signal from the transmitting unit and forward it to the receiving unit, and a second relay node of a second multi-hop communication path being arranged to receive a signal from the transmitting unit and forward it to the receiving unit, said method comprising:
   identifying at least a first communication path and a second communication path, respectively between the transmitting unit and the receiving unit, at least one of said paths involving the first or the second relay node;
   calculating at least a first capacity of the first communication path and a second capacity of the second communication path, respectively, said first capacity and second capacity representing long-term capacities of said first and second communication paths respectively, said long-term capacities calculated based on a mean value and a variance of channel statistics and a number of transmitting antennas; and transmitting information related to the capacities of the communication paths to at least one other communication unit in the wireless network provided for comparing the first and second capacities and selecting a relaying scheme between relaying schemes based on the first and second capacities, at least one of the relaying schemes involving cooperative relaying between the first and second relay nodes.

12. A method according to claim 11, wherein at least one of the capacities is calculated based on second order statistics for each communication path.

13. A method according to claim 11, wherein at least one of the capacities is calculated as an ergodic capacity based on the equation $$C_{erg} \approx R\log_2(e)\left(\ln\left(1 + \frac{S}{n_t RN}\mu_\lambda\right) - \frac{\sigma_\lambda^2}{2\left(\frac{n_t RN}{S} + \mu_\lambda\right)^2}\right),$$

wherein
R is the code rate of Space Time Block Coding (STBC),
S/N is the transmitted Signal to Interference and Noise Ratio (SINR),
$n_t$ is the number of transmitting antennas,
$\mu$ is the mean value and $\sigma^2$ is the variance of the channel in a second hop.

14. The method of claim 11, wherein the selecting of a relaying scheme between relaying schemes based on the first and second capacities by the at least one other communication unit comprises switching between cooperative relaying selection diversity and relaying space time block coding (STBC) based on the first and second capacities.

15. A method for a wireless communications network comprising at least one transmitting unit arranged for wireless communication with at least one receiving unit, said network further comprising at least a first relay node of a first communication multi-hop path arranged to receive a signal from the transmitting unit and forward it to the receiving unit and a second relay node of a second multi-hop communication path being arranged to receive a signal from the transmitting unit and forward it to the receiving unit, said method comprising:

receiving information from another communication unit in the wireless communication network, said other communication unit identifying at least the first communication path and the second communication path, respectively between the transmitting unit and the receiving unit, calculating at least a first capacity of the first communication path and a second capacity of the second communication path, respectively, said first capacity and second capacity representing long-term capacities of the first and second communication paths respectively, said long-term capacities calculated based on a mean value and a variance of channel statistics and a number of transmitting antennas; and comparing the first and second capacities and selecting a relaying scheme between relaying schemes based on the first and second capacities, at least one of the relaying schemes involving cooperative relaying between said first and second relay nodes.

16. A method according to claim 15, wherein at least one of the capacities is calculated based on second order statistics for each of the communication paths.

17. A method according to claim 15, wherein at least one of the capacities is calculated as an ergodic capacity based on the equation $$C_{erg} \approx R\log_2(e)\left(\ln\left(1 + \frac{S}{n_t RN}\mu_\lambda\right) - \frac{\sigma_\lambda^2}{2\left(\frac{n_t RN}{S} + \mu_\lambda\right)^2}\right),$$

wherein
R is the code rate of Space Time Block Coding (STBC),
S/N is the transmitted Signal to Interference and Noise Ratio (SINR),
$n_t$ is the number of transmitting antennas,
$\mu$ is the mean value and $\sigma^2$ is the variance of the channel in a second hop.

18. The method of claim 15, wherein the selecting of a relaying scheme between relaying schemes based on the first and second capacities comprises switching between cooperative relaying selection diversity and relaying space time block coding (STBC) based on the first and second capacities.

* * * * *